United States Patent Office 3,003,514
Patented Oct. 10, 1961

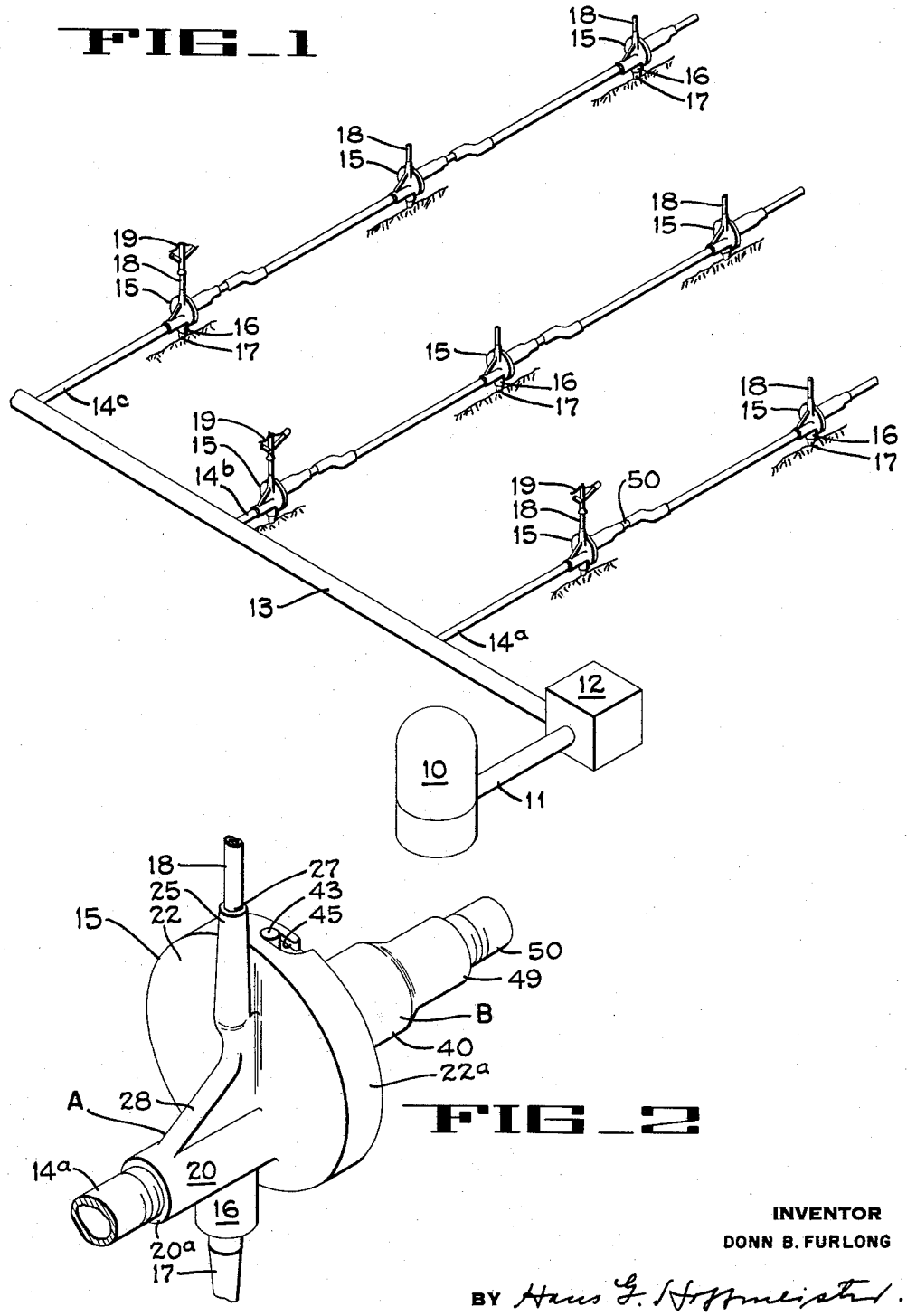

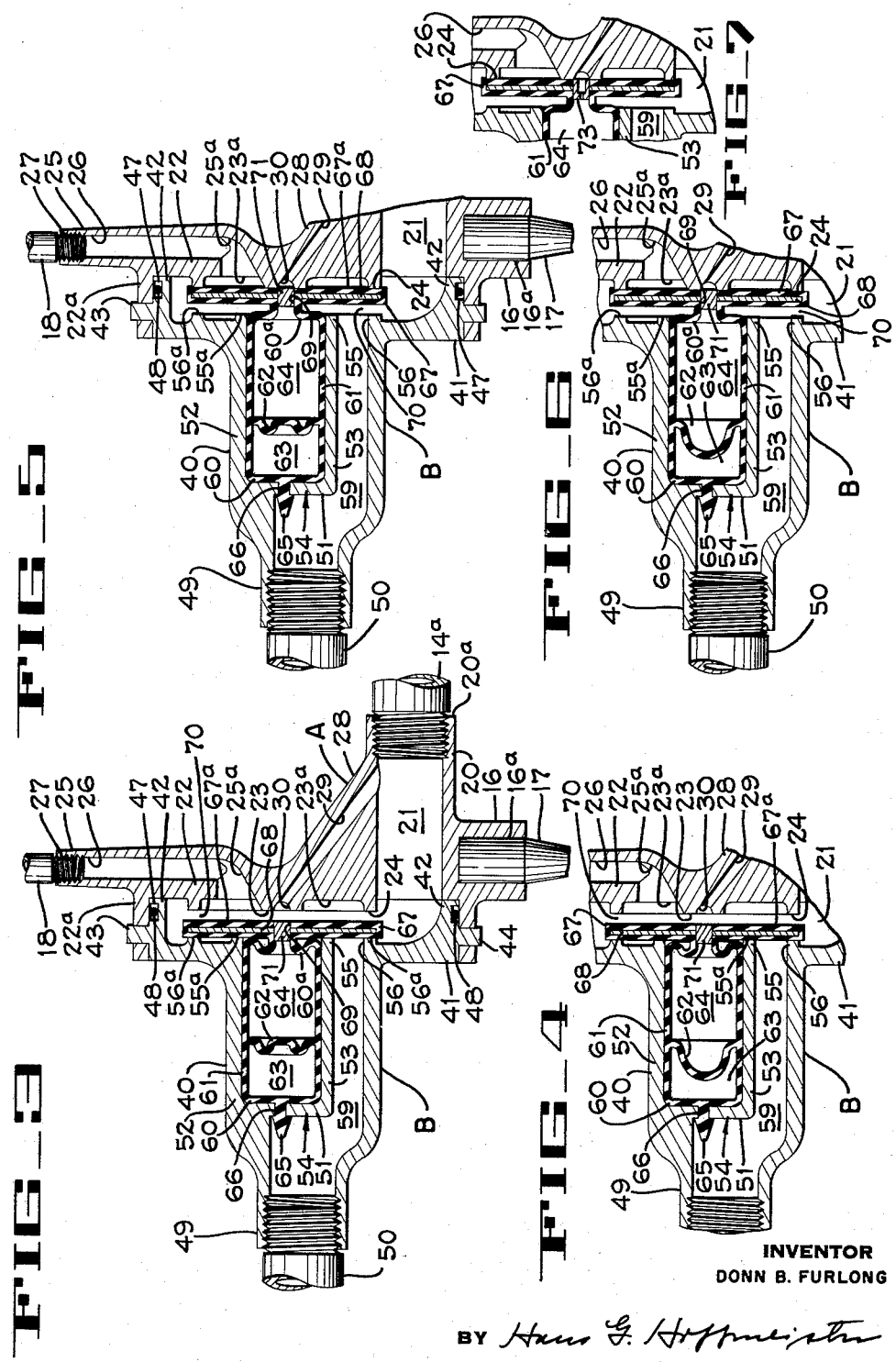

3,003,514
FLUID FLOW CONTROL APPARATUS
Donn B. Furlong, Port Washington, Wis., assignor to FMC Corporation, a corporation of Delaware
Filed June 11, 1959, Ser. No. 819,700
4 Claims. (Cl. 137—119)

The present invention relates to fluid flow control apparatus, and more particularly to a system providing automatic control of fluid flow for sequential irrigation purposes.

Sequential irrigation systems have particular value in the irrigation of row crops. In a system of this type, a main pipe line, capable of transmitting sufficient water for irrigating a desired area, is permanently installed, usually along one edge of the area. A plurality of permanent or semi-permanent lateral pipe lines extend from the main pipe line out between the rows of crops. Each of the lateral pipe lines is provided with a series of sprinkler heads, and with valves making it possible to operate the sprinkler heads in the series in succession. Thus, in any particular lateral line, the sprinkler head closest to the main line is usually operated first, and each of the other sprinkler heads is then operated in turn, until all of the sprinkler heads in the line have been operated.

The primary advantage of the use of a sequential irrigation system is the resultant savings in pipe line costs. It will be recognized that, if all of the sprinkler heads in a particular lateral pipe line were to be operated simultaneously, a line of quite large diameter would be required to supply them. In distinction, a sequential system enables the use of lateral pipe lines just large enough to transmit enough water for the operation of one sprinkler head at a time.

The use of a sequential irrigation system, however, has certain economic disadvantages. The initial cost of such a system has usually been extremely great, due to the large number of valves and sprinkler heads employed. Expensive valve structures, embodying a large number of moving parts of special corrosion-resistant materials, have been required. In addition, the maintenance costs have been high since a chief source of trouble is the clogging of the valves by solid particles present in the irrigation water. The operating expenses also have been great. A particular factor here has been the high pressure drop across each valve, and the high pumping pressures necessitated as a result.

It is therefore an object of the present invention to provide an improved sequential irrigation system.

Another object of the invention is to provide an improved valve for sequential irrigation systems.

Another object of the present invention is to provide a valve for a sequential irrigation system of inexpensive construction.

Another object of the present invention is to provide a valve for sequential irrigation systems, which is particularly adapted for automatic control.

Another object of the present invention is to provide a valve for sequential irrigation systems, which is automatically operated by a reduction in pressure of the liquid flowing through the pipe line in which the valve is installed.

Another object of the present invention is to provide a valve for sequential irrigation lines, which will produce a minimum of pressure drop thereacross.

These and other objects and advantages of the present invention will become apparent from the following description and the drawings, in which:

FIG. 1 is a perspective of a part of a sequential irrigation system, incorporating the valve of the present invention.

FIG. 2 is a perspective of the valve of the invention, the inlet and outlet pipes and supporting spike thereof being shown broken away.

FIG. 3 is a vertical medial section through the valve of FIG. 2, illustrating a first operational position of the internal parts thereof.

FIG. 4 is a fragmentary vertical medial section through the valve, illustrating a second operational position thereof.

FIG. 5 is a view similar to FIG. 3, illustrating a third operational position of the valve elements.

FIG. 6 is a view similar to FIG. 4, illustrating a fourth operational position of the valve elements.

FIG. 7 is a fragmentary sectional view illustrating a second embodiment of the valve of the present invention.

Referring to FIG. 1, a sequential irrigation system is shown in part. A pump 10, of conventional design, forces water through an outlet pipe 11 into an automatic timing valve 12. The valve 12 is of any suitable design, and serves to periodically effect a temporary reduction in the pressure of water flowing in the system, for a purpose to be explained hereinbelow. The water flows from the valve 12 into the main pipe line 13. Extending from the main line 13 are three spaced parallel lateral pipe lines 14a, 14b and 14c which are of identical construction. Spaced along each of the lateral pipe lines is a series of identical units 15 each of which includes a sprinkler head support and a valve. Each unit 15 (FIG. 3) carries a downwardly projecting leg 16 having a socket 16a, which receives the upper end of a stake 17. The latter is adapted to be inserted into the ground to be irrigated, and to maintain the unit 15 in upright position a short distance above the ground.

As seen in FIG. 1, the units 15 may be placed in staggered positions along the three pipe lines 14a, 14b and 14c, so that all parts of the area to be irrigated will receive approximately the same amount of water. A riser pipe 18 is threaded into each of the units 15, being adapted to carry at its top a sprinkler head such as shown at 19. The riser pipes 18 and sprinkler heads 19 are of conventional design, and will not here be specifically described. Inasmuch as the units 15 are identical in structure, only that member located closest to the main line 13 along the pipe line 14a will be described.

Referring more particularly to FIGS. 2 and 3, it will be seen that the unit 15 comprises a housing section A at the inlet end, and a housing section B at the outlet end thereof. These two sections are preferably constructed of die cast aluminum. The section A has a lower tubular portion 20, which provides a horizontally extending inlet passage 21, and is internally threaded at its inlet end 20a to receive the threaded end of the lateral pipe line 14a. Opposite the inlet end 20a, the housing section A has a vertical wall 22 which has an outwardly projecting peripheral flange 22a. At a point radially inwardly of the flange 22a, the wall 22 has a flat rear face 23 in which an annular recess 23a is formed. The annular portion of the wall 22 around the recess 23a provides an annular valve seat 24. A vertically projecting tube 25 is formed integrally with the wall 22 and projects upwardly therefrom to provide a discharge or outlet passageway 26. The riser pipe 18, which carries at its upper end the sprinkler head 19, is supported by the tube 25, a water-tight threaded connection being provided at 27. The lower end of tube 25 communicates through a curved passage 25a with the annular recess 23a in wall 22.

A web 28 extends between the upper surface of the inlet tube 20 and the outer face of the circular wall 22. An inclined auxiliary passage 29 extends through the web 28, providing communication between the inlet passage 21 and a central opening 39 in the wall 22.

The housing section B is formed with a cylindrical neck 40 having at one end an annular wall 41 from the outer edge of which a cylindrical flange 42 projects. The flange 42, which carries two outwardly projecting diametrically opposed pins 43 and 44, is adapted to be positioned inside the peripheral flange 22a of wall 22. Two diametrically opposed L-shaped slots 45, one only being shown in FIG. 2, are cut in the flange 22a to receive the pins 43 and 44, respectively, to provide a bayonet-type joint. The flange 42 is provided adjacent its outer end with an annular groove 47, in which is positioned a resilient gasket 48, which assures watertightness of the joint. The neck 40 of housing section B is reduced at its outer end 49, and is at this end internally threaded to receive the threaded end of an outlet pipe 50, which forms the second pipe section of pipe line 14a.

Within the neck 40, adjacent the reduced end 49 thereof, is positioned a vertical circular wall 51. The wall 51 is integral with and projects downwardly from the upper curved wall portion 52 of the neck 40. A curved wall 53 extends horizontally from the circumferential edge of the wall 51 to a point adjacent the inner end of the neck 40, and at its top merges with the wall area 52. The walls 51 and 53, together with the wall portion 52, form a cylindrical support member 54 within the housing B. An inner and an outer annular ridge 55 and 56 respectively are formed on the end face of the wall 41 of housing portion B, providing annular valve seating surfaces 55a and 56a respectively. A channel 59 within the neck 40 provides a bypass passage around the support member 54. The cylindrical support member can be considered to form a main chamber in the valve housing.

Positioned within the support member 54 is a bladder-like valve actuator 60 which has a tubular portion 61 that is preferably constructed of rubber or other elastic material, and is divided by a transversely extending rubber diaphragm 62. Thus, the actuator provides two contractible and expandable enclosures which define two pressure chambers 63 and 64. Chamber 63 can be termed a control compartment whereas chamber 64 can be termed a liquid receiving enclosure, for reasons that will be apparent as this description proceeds. The actuator 60 is formed at its outer end with a button 65, which extends through an aperture 66 in the wall 51 to lock the actuator in place in the cylindrical housing 54. At its inner end, the actuator 60 has a flexible end wall 60a to which is connected a flow control element in the form of rubber valve disc 67, having a flat face 67a and a hollow center in which is positioned a metal insert 68, preferably of brass. The valve 67 is movable back and forth in a chamber 70 formed inwardly of the flange 42 between the face of end wall 41 and the face 23 of wall 22. A plug 71 of porous material such as sintered metal is disposed in an axially extending opening 69 cut through the disc 67 and through the insert 68. The sintered metal plug provides restricted flow passages communicating the chamber 70 with the pressure chamber 64 for retarding the passage of fluid into and out of the chamber 64. The chamber 63 contains a volume of air or some other suitable gas at atmospheric pressure. The initial normal or unstressed position of the diagram 62 and the end wall 60a is illustrated in FIG. 3.

The operation of the valve will be described with reference to FIGS. 3, 4, 5 and 6. In FIG. 3, the valve actuator 60 is shown in an inoperative position; that is its position when there is no water entering the inlet 21. When water is forced into the inlet 21 by operation of the pump 10, water proceeds through the chamber 70, the curved passage 25a, the passage 26, into the riser pipe 18, and out through the sprinkler head 19. At this time, water is present in the auxiliary passageway 29 in the web 28. The pressure of the water maintains the valve disc 67 tight against the vertical seating surfaces 55a and 56a of housing section B, and passage of water through the bypass channel 59 is therefore prevented. As a consequence, passage of water to the succeeding valves in the pipe line is prevented. However, water does seep through the porous plug 71 and into the chamber 64. The resultant pressure upon the membrane 62 will distend the latter, causing it to take the position shown in FIG. 4, thereby compressing the gas in the chamber 63. It will be realized that in a matter of a few seconds, the pressure of the gas in the chamber 63 will rise to substantially that of the water flowing through the unit 15. Since the effective area of end wall 60a is less than the area of the valve face 67a, the valve disc 67 will not be moved.

After the sprinkler head 19 associated with unit 15 has been operated for a desired period of time, the timing valve 12 interrupts the flow of water into the main line 13, thus causing a temporary drop in pressure in the main line, and consequently in the lateral line 14a. During this period of reduced pressure, which may, for example, last for approximately six seconds, there is little or no pressure against the face of valve disc 67. Accordingly, the flexed diaphragm 62 will be moved back to its initial position, causing the disc 67 to move into contact with valve seat 24, as seen in FIG. 5. The flexible end wall 60a of the actuator accommodates this movement of the valve disc. Since water seeps slowly through the porous plug 71, there will be little loss of water from chamber 64 during this period of reduced pressure.

When the valve disc 67 is in engagement with valve seat 24, the outlet passageway 26 is closed off, and communication is established between the inlet passageway 21 and the bypass channel 59. Water will then be free to flow into the outlet pipe 50 and on to the next adjacent unit 15 in the line 14a for operation of the sprinkler head mounted thereon.

When the timer 12 again causes the flow of water into line 14a, water will flow through the auxiliary passageway 29 in the web 28, through the porous plug 71, and into the chamber 64 to again cause deflection of the membrane 62. The position then will be as shown in FIG. 6. Since there is no pressure on the face of the valve disc 67, it will remain seated on valve seat 24. The volume of water in the chamber 64 will increase, as compared to that present when the valve disc 67 was first moved to actuated position, and the gas in chamber 63 will again be compressed.

Upon subsequent temporary drops in the pressure of water flowing through the lateral pipe line 14a, the valve disc 67 in each successive unit 15 in the line will, in turn, be moved from inoperative to actuated position. These consecutive periods of reduced pressure will have no effect upon a valve which has previously been moved into such position. During such intervals of reduced pressure, the compressed gas in the chamber 63 of each actuator 60, having a valve head already in actuated position, will expand to compensate for any loss of water from the chamber 64 by way of the passageway 29, and the fully extended length of the actuator 61 will therefore not change. As a result, the valve disc 67 will be maintained in actuated position. The pressure of water present in the chamber 70 also will tend to maintain the valve disc 67 in such position.

When all of the sprinkler heads in the line 14a have been operated, and the valve discs 67 of all of the members 15 have been actuated as above described, thus marking the end of a period of irrigation, the water supply will usually be turned off completely for a prolonged period of time. During this period, the pressure in the lateral pipe line 14a will be released. Under the pressure of expanding gas in the chamber 63, water will then slowly be discharged through the porous plug 71 and into the passageway 29. After a short period of time, for example, twenty seconds, all of the valves will return to the position of FIG. 3.

It will be realized that, although the automatic valve 12 has been shown for timing the pressure drops in the system, a manually operated valve could be employed for this purpose.

As a possible modification in the structure of the actuator 60, the porous-metal plug 71 may be replaced by a non-porous plug 73 having a small orifice, as shown in FIG. 7.

Having thus described my invention, what I claim as new and desire to protect by Letters Patent is:

1. A valve construction comprising a housing having a liquid inlet port and a liquid outlet port, a valve element mounted within said valve housing for movement between two positions for respectively opening and closing the outlet port, means for directing liquid entering said housing through said inlet port into contact with said valve element to urge it to the position in which said outlet port is open, valve element control means mounted in said housing, said control means having a main chamber formed in a wall of said housing, a movable member in said main chamber dividing the chamber into a sealed-off compartment filled with gas and a liquid receiving enclosure, valve element operating means connected to said valve element, said valve element operating means providing a movable wall of said liquid receiving enclosure, and orifice means for establishing restricted communication between said inlet port and said liquid receiving enclosure, entrance of liquid from said inlet port into said liquid receiving enclosure shifting said movable member in one direction to compress the gas in said sealed off compartment, interruption of the flow of liquid through said housing causing the pressure in said sealed-off compartment to shift said movable member in the other direction, said motion being transmitted by liquid trapped in said liquid receiving enclosure to cause motion of said valve element operating means and hence said valve element to the position closing said liquid outlet port.

2. A valve construction comprising a housing having an inlet passage and two discharge passages, a flow control valve element disposed in said housing and having opposed first and second seating faces, said valve element being movable between two alternate positions in each of which said valve elements establish flow communication between said inlet passage and one of said discharge passages while one face of the valve element cuts off communication with the other discharge passage, means for directing liquid entering said housing into contact with the first face of said valve element to move it to one of said flow control positions, means defining an enclosed chamber in said housing, a flexible wall forming one boundary of said chamber and connected to the second face of said valve element, restricted orifice means for establishing flow communication between said inlet passage and said chamber to subject said chamber to the pressure of liquid in said inlet passage whereby pressure is built up slowly relative to the rate of pressure built up in said housing and is dissipated slowly when pressure in the housing is decreased, and means for resiliently opposing the entry of liquid into said chamber.

3. A valve construction comprising a housing an inlet passage and two discharge passages, means providing a valve seat for each discharge passage, a flow control valve element mounted in said housing for movement between a first position in sealing engagement with one valve seat and a second position in sealing engagement with the other seat, means for directing the liquid entering said housing into contact with said valve element to urge it toward said first position, means in said housing defining a main chamber, a flexible diaphragm in said chamber dividing the same into a control compartment filled with gas and a liquid receiving enclosure, said liquid receiving enclosure being bounded by a flexible end wall, means connecting said flexible end wall to said valve element, and restricted orifice means for directing a portion of the liquid passing through said housing into said liquid receiving enclosure to deflect said diaphragm in a direction that reduces the volume of said control compartment and raises the pressure of the gas therein, the gas in said compartment being effective, when liquid pressure in said housing is reduced, to move said diaphragm in the opposite direction with the liquid in said liquid receiving enclosure transmitting such motion to the flexible end wall and to the connected valve element to move the valve element toward said second position.

4. A valve construction comprising a housing having a liquid inlet port and a liquid outlet port, a valve element mounted within said valve housing for movement between two positions for respectively opening and closing the outlet port, means for directing liquid entering said housing through said inlet port into contact with said valve element to urge it to the position in which said outlet port is open, valve element control means mounted in said housing, said control means having a main chamber formed in a wall of said housing, a movable member in said main chamber dividing the chamber into a control compartment and a liquid receiving enclosure, resilient means in said control compartment for resisting motion of said movable member in a direction tending to reduce the size of said control compartment, valve element operating means connected to said valve element, said valve element operating means also forming a movable wall of said liquid receiving enclosure, and orifice means for establishing restricted communication between said inlet port and said liquid receiving enclosure, entrance of liquid from said inlet port into said liquid receiving enclosure shifting said movable member in one direction to compress said resilient means in said control compartment, interruption of the flow of liquid through said housing causing said resilient means in said control compartment to shift said movable member in the other direction, said motion being transmitted by liquid trapped in said liquid receiving enclosure to cause motion of said valve element operating means and hence motion of said valve element to the position closing said liquid outlet port.

References Cited in the file of this patent
UNITED STATES PATENTS

| | | |
|---|---|---|
| 1,703,570 | Borck | Feb. 26, 1929 |
| 2,858,764 | Hesson | Nov. 4, 1958 |